United States Patent [19]

Suyama

[11] Patent Number: 5,299,048

[45] Date of Patent: Mar. 29, 1994

[54] OPTICAL AMPLIFIER AND OPTICAL COMMUNICATION SYSTEM PROVIDED WITH THE OPTICAL AMPLIFIER

[75] Inventor: Masuo Suyama, Sagamihara, Japan

[73] Assignee: Fujitsu Limited, Kawasaki, Japan

[21] Appl. No.: 987,568

[22] Filed: Dec. 8, 1992

Related U.S. Application Data

[63] Continuation of Ser. No. 574,097, Aug. 29, 1990, abandoned.

[30] Foreign Application Priority Data

Aug. 31, 1989 [JP] Japan ................. 1-223172

[51] Int. Cl.⁵ .................. H04B 10/02; H04B 10/16
[52] U.S. Cl. ............................. 359/179; 359/113; 359/134; 359/160; 359/174; 359/341; 372/6
[58] Field of Search ............. 359/124, 113, 134, 160, 359/162, 174, 176, 179, 181, 341; 372/6

[56] References Cited

U.S. PATENT DOCUMENTS

| | | | |
|---|---|---|---|
| 4,712,075 | 12/1987 | Snitzer | 330/4.3 |
| 4,723,824 | 2/1988 | Shaw et al. | 330/4.3 |
| 4,839,898 | 6/1989 | Payne et al. | 372/6 |
| 4,959,837 | 9/1990 | Fevrier et al. | 372/6 |
| 5,005,175 | 4/1991 | Desurvire et al. | 330/4.3 |
| 5,007,698 | 4/1991 | Sasaki et al. | 370/1 |
| 5,008,887 | 4/1991 | Kafka et al. | 372/6 |

FOREIGN PATENT DOCUMENTS

| | | |
|---|---|---|
| WO86/07642 | 12/1986 | European Pat. Off. . |
| 0345957 | 12/1989 | European Pat. Off. ......... 372/6 |
| 56-165437 | 12/1981 | Japan ........................ 455/601 |
| 0126696 | 7/1984 | Japan ........................ 372/6 |
| 61-075326 | 4/1986 | Japan ........................ 455/612 |
| 63-200632 | 8/1988 | Japan ........................ 455/609 |
| 2227359 | 7/1990 | United Kingdom ........... 372/6 |

Primary Examiner—Richard E. Chilcot, Jr.
Assistant Examiner—K. Negash
Attorney, Agent, or Firm—Staas & Halsey

[57] ABSTRACT

An optical communication system for obtaining transmission of information with a pumping light beam acting as carrier, in addition to transmission of information with a signal light beam. This optical communication system includes an optical fiber amplifier amplifying a signal light beam by having the signal light beam and a pumping light beam propagated through a rare-earth-doped fiber, and a modulating circuit for modulating the pumping light beam with a high-frequency modulating signal having a period shorter than the life span of fluorescence resulting from an excited state. When the signal light beam and the pumping light beam are propagated in the same direction through the rare-earth-doped fiber, the transmission of information with the pumping light beam acting as a carrier constitutes a transmission of a supervisory signal for an optical repeater, and when the signal light beam and the pumping light beam are propagated in directions opposite to each other through the rare-earth-doped fiber, a two-way transmission is achieved by the transmission of information with the signal light beam and the transmission of information with the pumping light beam.

8 Claims, 6 Drawing Sheets

OPTICAL AMPLIFIER AND OPTICAL COMMUNICATION SYSTEM PROVIDED WITH THE OPTICAL AMPLIFIER

This application is a continuation of application Ser. No. 07/574,097, filed Aug. 29, 1990, now abandoned.

BACKGROUND OF THE INVENTION

The present invention relates to an optical communication system provided with an optical fiber amplifier and, more particularly, to an optical communication system provided with an optical fiber amplifier constituted of a rare-earth-doped fiber which is with a rare earth element.

Optical amplifiers which are capable of amplifying an optical signal directly without using an electric circuit, are being intensively studied in many research institutions as a key device in the optical communication system in the future because of their characteristic, readiness to provide large capacity, and capability of amplifying multiple channels en bloc. Optical communication systems including such optical amplifiers have been proposed such that employ the optical amplifier as an optical power booster for compensating for branching or insertion loss and increasing the transmission power, that use the optical amplifier as an optical preamplifier for improvement of reception sensitivity, that use the optical amplifier as an optical repeater whereby miniaturization of the repeater is achieved and reliability on the repeater is enhanced, and so on. Research is being conducted for optimized arrangement of such systems.

Optical amplifiers that are the objects of the research conducted so far are broadly classified into: (a) optical amplifiers using an optical fiber doped with a earth element such as Er, Nd, and Yb (hereinafter referred to as "rare-earth-doped fiber", this term covering a wide range of waveguide structures including a waveguide doped with a rare earth element); (b) optical amplifiers of a semiconductor laser type; and (c) optical amplifiers making use of the non-linearity within an Of these, the optical amplifier (a) above, i.e., that uses a rare-earth-doped fiber, has advantageous characteristics such that it has no dependency on polarization, produces low noise, and incurs a small loss at its coupling with the transmission line.

When an optical amplifier is used as an optical repeater, a supervisory control function for the optical amplifier is indispensable. As a supervisory the optical amplifier (b) above, i.e., the one being of a semiconductor laser type, there is known a system disclosed, for example, in Ellis, A. D. et al.: Supervisory system for cascaded semiconductor laser amplifier repeaters, *Electron. Lett.*, Vol. 25, No. PP. 309-311 (Mar. 2, 1989). However, since the for the semiconductor laser-type optical amplifier is such that the injection current to the semiconductor laser type optical amplifier is detected therein, the same system as above cannot be applied to the optical communication system provided with an optical fiber amplifier. In other words, there is found no prior art supervisory control system suitable for optical fiber amplifiers.

SUMMARY OF THE INVENTION

An optical communication system provided with an optical fiber amplifier uses a pumping light beam to effect the optical amplification. Hence, if transmission of information using the pumping light beam can be performed in the system in addition to transmission of information with a signal light beam, then it becomes possible to have supervisory control performed in the optical communication system provided with the optical fiber amplifier as an optical repeater. Since the optical amplification of a signal light beam is effected not only when a pumping light beam introduced into a rare-earth-doped fiber is in the same direction as the signal light beam, but also when the pumping light beam is in the opposite direction to the signal light beam, when transmission of information is possible with the use of the pumping light beam, it becomes possible to achieve a two-way transmission by making use of such characteristics.

Accordingly, an object of the present invention is to provide an optical communication system having an optical fiber amplifier capable of transmission of information with a pumping light beam, in addition to transmission of information with a signal light beam.

In accordance with an aspect of the present invention, there is provided an optical communication system having an optical repeater including an optical fiber amplifier adapted to amplify a signal light beam by having the signal light beam and a pumping light beam propagated through the rare-earth-doped fiber of the optical doped with a rare earth element. This system includes a pumping light source for emitting the pumping light beam, and means for modulating the pumping light beam with a modulating signal having a period shorter than the life span of fluorescence resulting from an excited state, whereby transmission of information is achieved with pumping light beam acting as a carrier, in addition to transmission of information with the signal light beam.

Since in the present invention the pumping light beam is modulated by a high-frequency modulating signal with a period shorter than the life span of the fluorescence resulting from an excited state, it is possible to achieve transmission of information with the pumping light beam, in addition to transmission of information with the signal light beam, without adversely affecting the amplification of the signal light beam by the pumping light beam. Consequently, in the case where the signal light beam and the pumping light beam are arranged to be propagated in the same direction through the rare-earth-doped fiber, transmission of a supervisory signal for an optical repeater can be simply pumping light beam as the carrier. In the case where the signal light beam and the pumping light beam are arranged to be propagated in directions opposite to each other through the rare-earth-doped fiber, a two-way transmission can be achieved by transmission of information with the signal light beam and transmission of information with the pumping light beam. The transmission of information with the pumping light beam includes a transmission of a supervisory signal for an optical repeater.

The above and other objects, features and advantages of the present invention and the manner of realizing them will become more apparent, and the invention itself will best be understood from a study of the following description and appended claims, with reference to the attached drawings showing some preferred embodiments of the invention.

DESCRIPTION OF THE PREFERRED EMBODIMENTS

Figure 1:
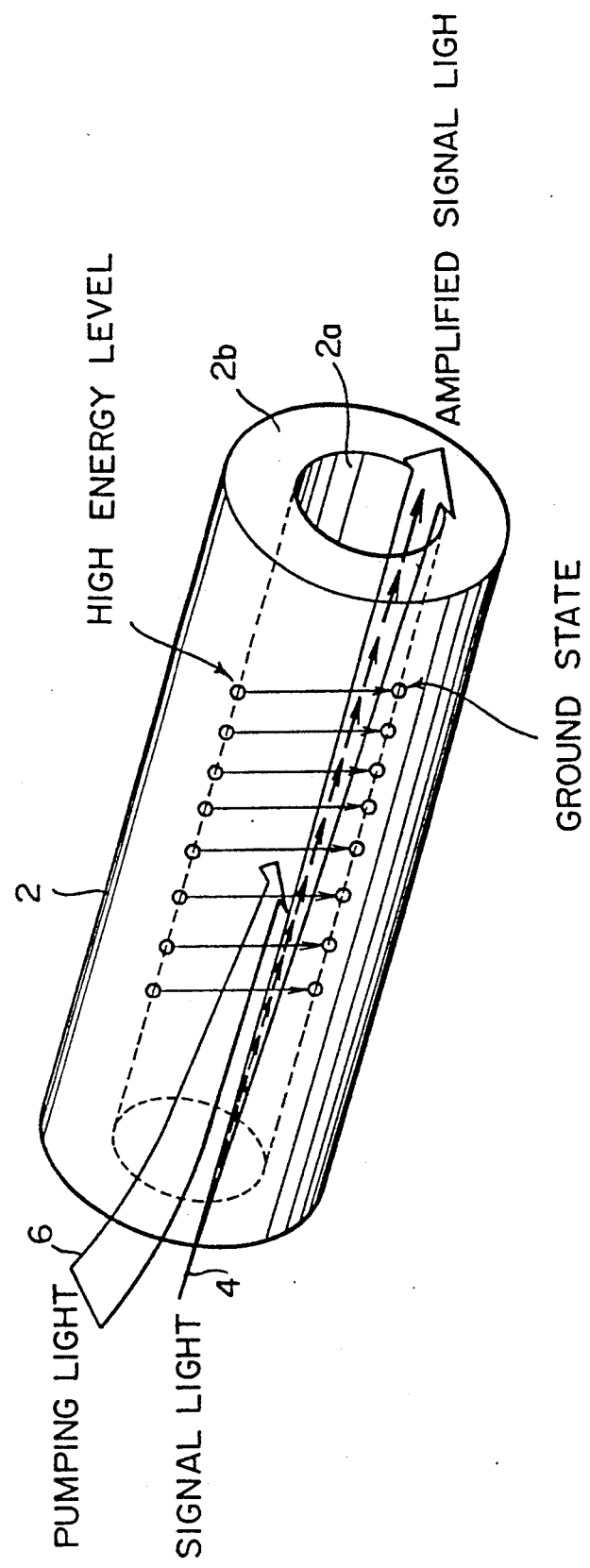
FIG. 1 is a schematic diagram showing the principle of optical amplification effected by a rare-earth-doped fiber.

FIG. 1 shows the principle of optical amplification by means of a rare-earth-doped fiber. Reference numeral 2 denotes a rare-earth-doped fiber formed of a core 2a and a clad 2b, of which the core 2a is doped with a rare earth element such as erbium (Er). When a pumping light beam is led into such a rare-earth-doped fiber 2, the rare earth atoms are excited to a high energy level. When a signal light beam is allowed to impinge on the rare earth atoms excited to the high energy level within the optical fiber 2, stimulated emission of light takes place causing transition of the rare earth atoms to the ground state, whereby the intensity of the signal light beam is progressively increased along the optical fiber, and thus, amplification of the signal light beam is effected. In the case where the doped rare earth element is erbium (Er), a laser beam whose wavelength is 1.49 μm band, for example, can be used as the pumping light beam when the signal light beam with a wavelength of 1.55 μm band is to be amplified. In the case where the doped rare earth element is neodymium (Nd), a laser beam whose wavelength is 0.8 μm band, for example, can be used as the pumping light beam when the signal light beam with a wavelength of 1.3 μm band is to be amplified. In the following, description of the present invention will be made assuming that the doped rare earth element is erbium.

Figure 2:
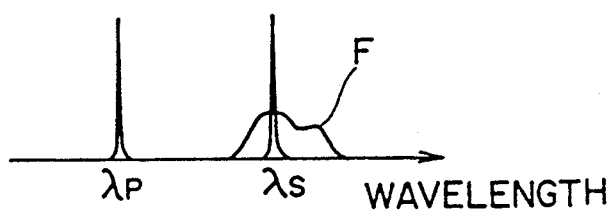
FIG. 2 is an explanatory drawing of fluorescence.
Figure 3:
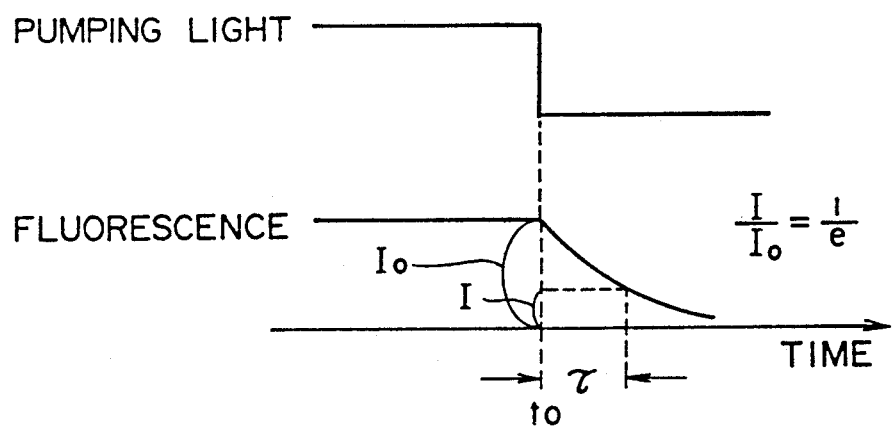
FIG. 3 is an explanatory drawing of the life span of fluorescence.

When a pumping light beam with a wavelength $\lambda_P$ is led into a rare-earth-doped fiber through which a signal light beam with a wavelength $\lambda_S$ is being propagated, the wavelength $\lambda_P$ being in a predetermined wavelength relationship with the wavelength $\lambda_S$, there is produced fluorescence whose spectrum is as shown by character F in FIG. 2 within the rare-earth-doped fiber in the vicinity of the spectrum of the signal light beam. The variation in the intensity of the fluorescence with time is not completely coincident with the variation in the intensity of the pumping light beam with time. That is, as shown in FIG. 3, supposing that the introduction of the pumping light beam is stopped at time $t_0$, the intensity of the fluorescence does not become zero instantly, but it gradually decreases taking a certain time constant. When the life span of fluorescence is defined as the time $\tau$ which is taken for the intensity I of the fluorescence to decrease from its value $I_0$ obtainable before the introduction of the pumping light beam is stopped to $1/e$ of $I_0$ (e: the base of natural logarithm), it is known that, even if the introduction of the pumping light beam is stopped, the amplification action for the signal light beam is maintained without causing unstable variations in the gain for a period of time within the range from the point of time $t_0$ to, approximately, when the life span of fluorescence $\tau$ elapses (Laming, R. I. et all.: Multi-channel crosstalk and pump noise characterization of $Er^{3+}$-doped fibre amplifier pumped at 980 nm, Electron. Lett., Vol. 25, No. 7, pp. 455–456 (Mar. 30, 1989)).

Accordingly, in the case where a pumping light beam is modulated by a high-frequency modulating signal whose period is shorter than the life span of florescence resulting from the excited state or thereabout, the modulation does not have an adverse effect on the amplification of the signal light beam.

Figure 4A:
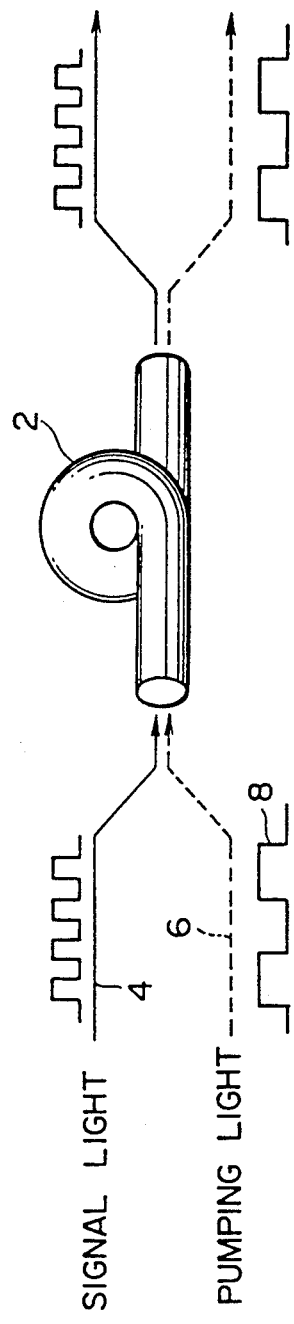
FIG. 4A is an explanatory drawing of the principle of the present invention in the case where the signal light beam and the pumping light beam are in the same direction.
Figure 4B:
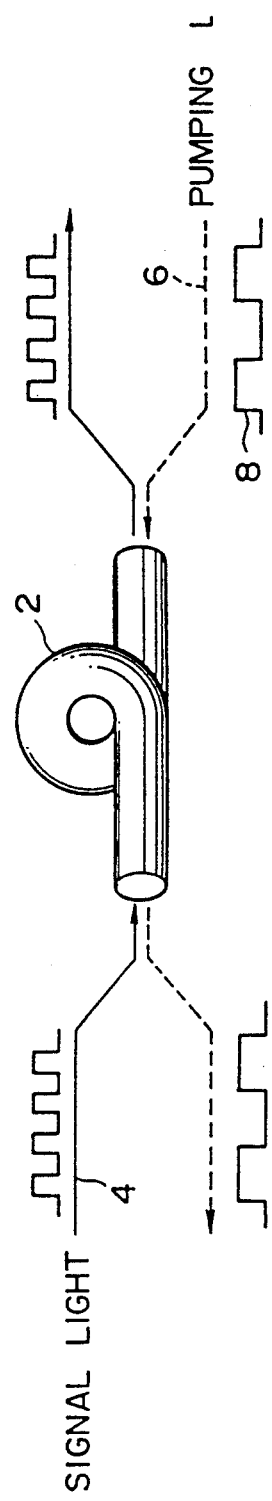
FIG. 4B is an explanatory drawing of the principle of the present invention in the case where the signal light beam and the pumping light beam are in the opposite directions.

Referring to FIG. 4A and FIG. 4B, FIG. 4A is for describing the principle of the present invention in the case where the signal light beam and the pumping light beam are propagated in the same direction through a rare-earth-doped fiber, whereas FIG. 4B is for describing the same in the case where the signal light beam and the pumping light beam are propagated in directions opposite to each other through a rare-earth-doped fiber.

The system of the present invention is such that, in an optical communication system provided with an optical fiber amplifier for amplifying a signal light beam 4 by having the signal light beam 4 and a pumping light beam 6 propagated through a rare-earth-doped fiber 2 doped with a rare earth element, the pumping light beam 6 is modulated by a high-frequency modulating signal 8 with a period shorter than the life span of fluorescence resulting from an excited state or thereabout, whereby transmission of information with the pumping light beam 6 acting as a carrier is achieved, in addition to transmission of information with the signal light beam 4.

Here, the rare-earth-doped fiber has, as described above, a wide meaning that covers general waveguide structures such as waveguides doped with a rare earth element. Therefore, an optical fiber amplifier achieving amplification of a signal light beam by propagating the signal light beam together with a pumping light beam through a rare-earth-doped fiber doped with a rare earth element covers not only optical amplifiers which use optical fibers as propagating media of light but also optical amplifiers using optical waveguide structures such as optical waveguides as propagating media of light.

When the signal light beam and the pumping light beam are propagated in the same direction through the rare-earth-doped fiber as shown in FIG. 4A, transmission of a supervisory signal for the optical repeater can be achieved with the pumping light beam acting as the carrier can be achieved.

On the other hand, when the signal light beam and the pumping light beam are propagated in directions opposite to each other through the rare-earth-doped fiber as shown in FIG. 4B, a two-way transmission can be achieved by transmission of information with the signal light beam and transmission of information with the pumping light beam acting as the carrier.

Figure 5:
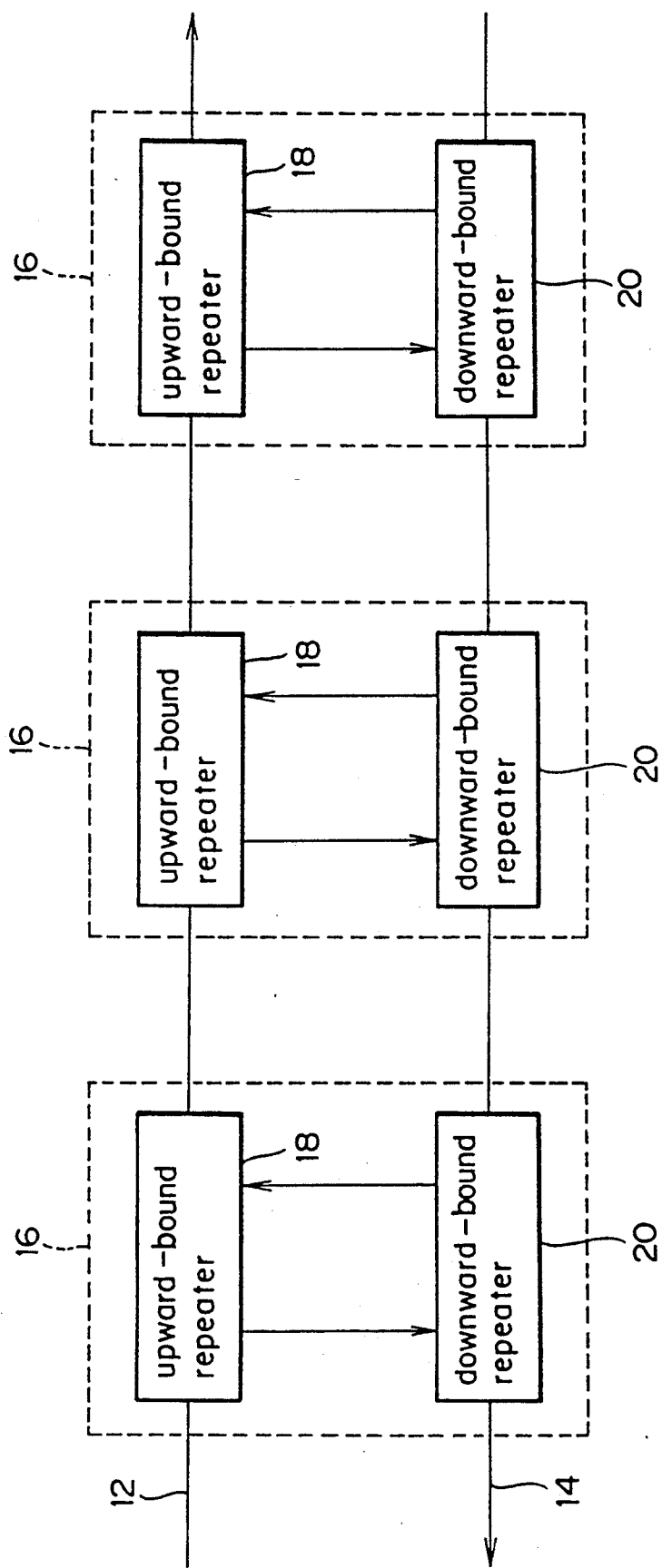
FIG. 5 is an explanatory drawing of an optical repeater unit according to an embodiment of the present invention.

FIG. 5 is an explanatory drawing of an optical repeater unit with the present invention applied thereto.

The drawing shows a system with two-way optical transmission lines formed of an upward-bound optical transmission line 12 and a downward-bound optical transmission line 14 with a single or a plurality (three in the illustrated case) of optical repeater units 16 provided along the two-way optical transmission lines. The optical repeater unit 16 includes an upward-bound repeater 18 connected with the upward-bound optical transmission line 12 and a downward-bound repeater 20 connected with the downward-bound optical transmission line 14. The upward-bound repeater 18 and downward-bound repeater 20 perform communication of supervisory information therebetween for achieving a supervisory control function for the optical repeater unit in addition to general repeater functions. While the communication of the supervisory information between the upward-bound and downward bound repeaters 18 and 20 is achieved by means of electric signals, the transmission of supervisory information through the optical transmission lines 12 and 14 is achieved by means of pumping light beams propagated through rare-earth-doped fibers included in the optical repeater unit 16.

Figure 6:
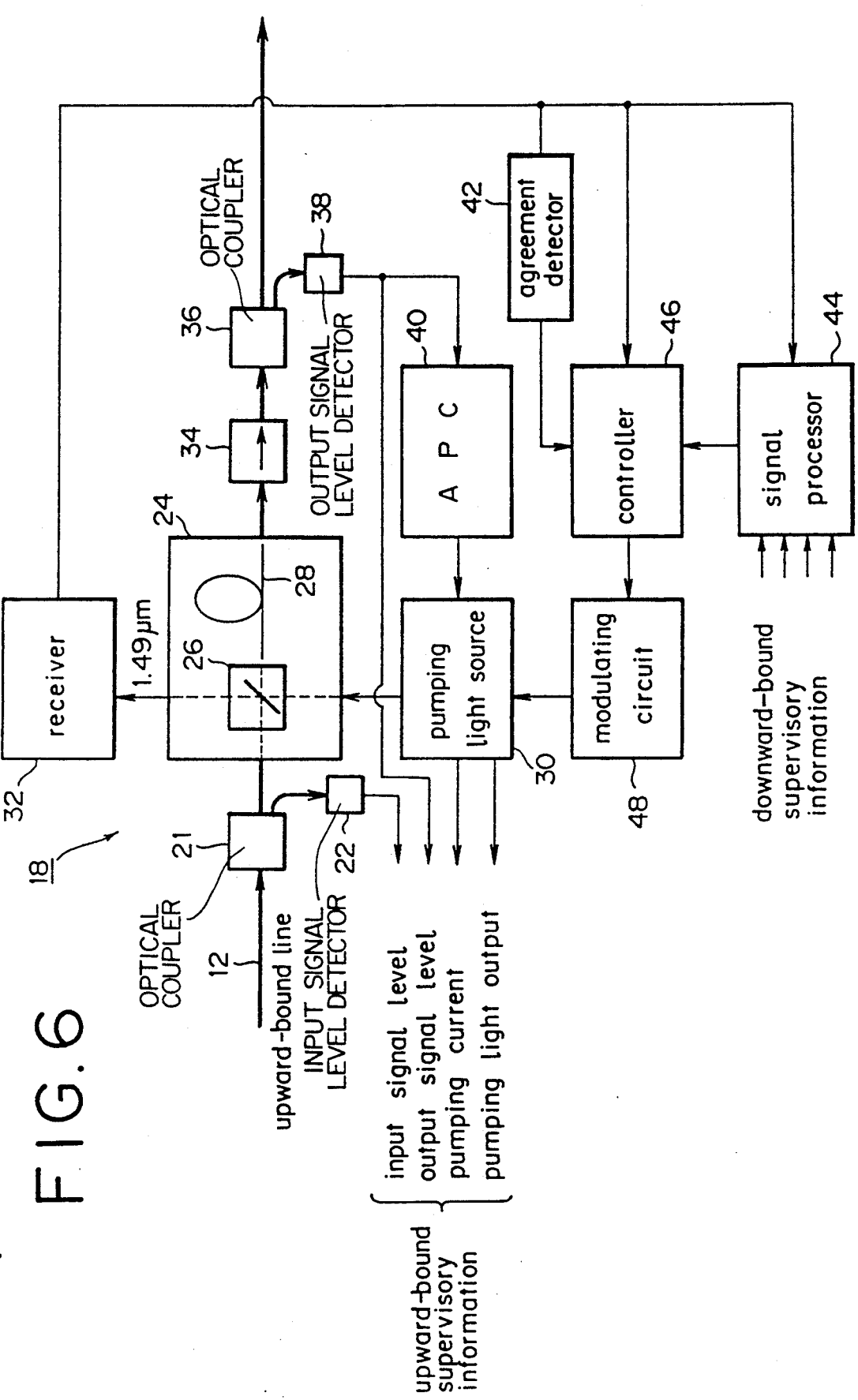
FIG. 6 is a block diagram of an upward-bound repeater according to an embodiment of the present invention.

FIG. 6 is a block diagram of the upward-bound repeater 18. The downward-bound repeater 20 has the same block structure as the upward-bound repeater 18. Referring to FIG. 6, the wavelength of the signal light beam propagated through the upward-bound optical transmission line 12 is 1.536 $\mu$m, or 1.552 $\mu$m, for example, and the wavelength of the pumping light beam is 1.49 $\mu$m, for example. The portion of the pumping light beam which has not contributed to the optical amplification arrives at an upward-bound repeater 18. The signal light beam and the pumping light beam are split by an optical coupler 21 into portions in the ratio of 1:100, for example. The smaller split portion of the beams is input to an input signal level detector 22 for level detection of the signal light beam. The larger split portion of the beams is input to an optical fiber amplifier 24.

The optical fiber amplifier 24 comprises a dichroic coupler 26 and a rare-earth-doped fiber 28 which has a core doped with erbium. The dichroic coupler 26 splits the beams from the optical coupler 21 into the signal light beam and the pumping light beam, and leads the signal light beam into the rare-earth-doped fiber 28 and the pumping light beam to a receiver 32. The dichroic coupler 26 further reflects a pumping light beam from a pumping light source 30 and leads it into the rare-earth-doped fiber 28.

The signal light beam amplified by the optical fiber amplifier 24 and the portion of the pumping light beam not consumed in the amplification of the signal light beam together are input to an optical coupler 36 through an optical isolator 34. The optical isolator 34 is provided for preventing oscillation from occurring due to gain of the rare-earth-doped fiber 28 as the result of formation of a resonator structure in the optical path including the rare-earth-doped fiber 28. The optical coupler 36 splits the input signal light beam and pumping light beam into portions in the ratio of 1:100, of which the larger split portion of the beams is reintroduced into the upward-bound optical transmission line 12 and the smaller split portion of the beams is input to an output signal level detector 38. The output signal level detector 38 suppresses the pumping light beam by means of an optical filter incorporated therein and detects the level of the amplified signal light beam.

The pumping light source 30 is constituted of a semiconductor laser in the present embodiment and the intensity of the pumping light beam output therefrom or the average value thereof is controlled so that the level of the above described output signal may become constant by means of an Automatic Power Control APC circuit 40 depending on the signal output from the output signal level detector 38. By virtue of this control, it becomes possible to have the signal light beam held at a constant level output from the upward-bound repeater 18 at all times regardless of the level of the signal light beam input to the upward-bound repeater 18.

The input signal level from the input signal level detector 22, the output signal level from the output signal level detector 38, the pumping current (the bias current for the semiconductor laser) in the pumping light source 30, and the pumping light output from the same are delivered to the downward-bound repeater 20 as upward-bound supervisory information, which is delivered to the downward-bound optical transmission line 14 by modulating the pumping light beam there (also refer to FIG. 5).

On the other hand, downward-bound supervisory information is accepted by the upward-bound repeater 18 through a signal processor 44 and the pumping light beam from the pumping light source 30 is modulated by the downward-bound supervisory information, whereby the downward-bound supervisory information is transmitted through the upward-bound optical transmission line 12.

The detailed operation of the above process will be described in as follows. A delivery command of the downward-bound supervisory information to the upward-bound repeater 18 is received by the receiver 32 of the upward-bound repeater and, thereupon, the receiver 32 decodes the command and informs a controller 46 of the decoded command. This decoding can be achieved by subjecting the address information received by the receiver 32 to detection performed in an agreement detector 42, as to whether it is in agreement with the address information stored therein in advance. The controller 46, upon receipt of the delivery command of the supervisory information, controls a modulating circuit 48 depending on the downward-bound supervisory information from the signal processor 44 and, thereby, the pumping light beam from the pumping light source 30 is intensity-modulated, for example. By arranging the modulation speed at this time to be sufficiently higher than the reciprocal of the life span of the fluorescence in the rare-earth-doped fiber 28, even if the pumping light beam from the pumping light source 30 is modulated, the modulation component hardly appears in the signal light beam amplified in and delivered from the upward-bound repeater 18. Thus, it becomes possible to achieve transmission of supervisory information carried by the pumping light beam acting as the carrier in addition to transmission of information with the signal light beam that is directly amplified. In the case where both sets of address information are not in agreement in the agreement detector 42 and, therefore, there is no necessity for delivering the downward-bound supervisory information to the upward-bound optical transmission line 12, the supervisory information carried by the pumping light beam accepted from the preceding stage by the receiver 32 is reproduced and amplified by the controller 46 and the information thus obtained is used for modulating the pumping light source 30.

Figure 7:
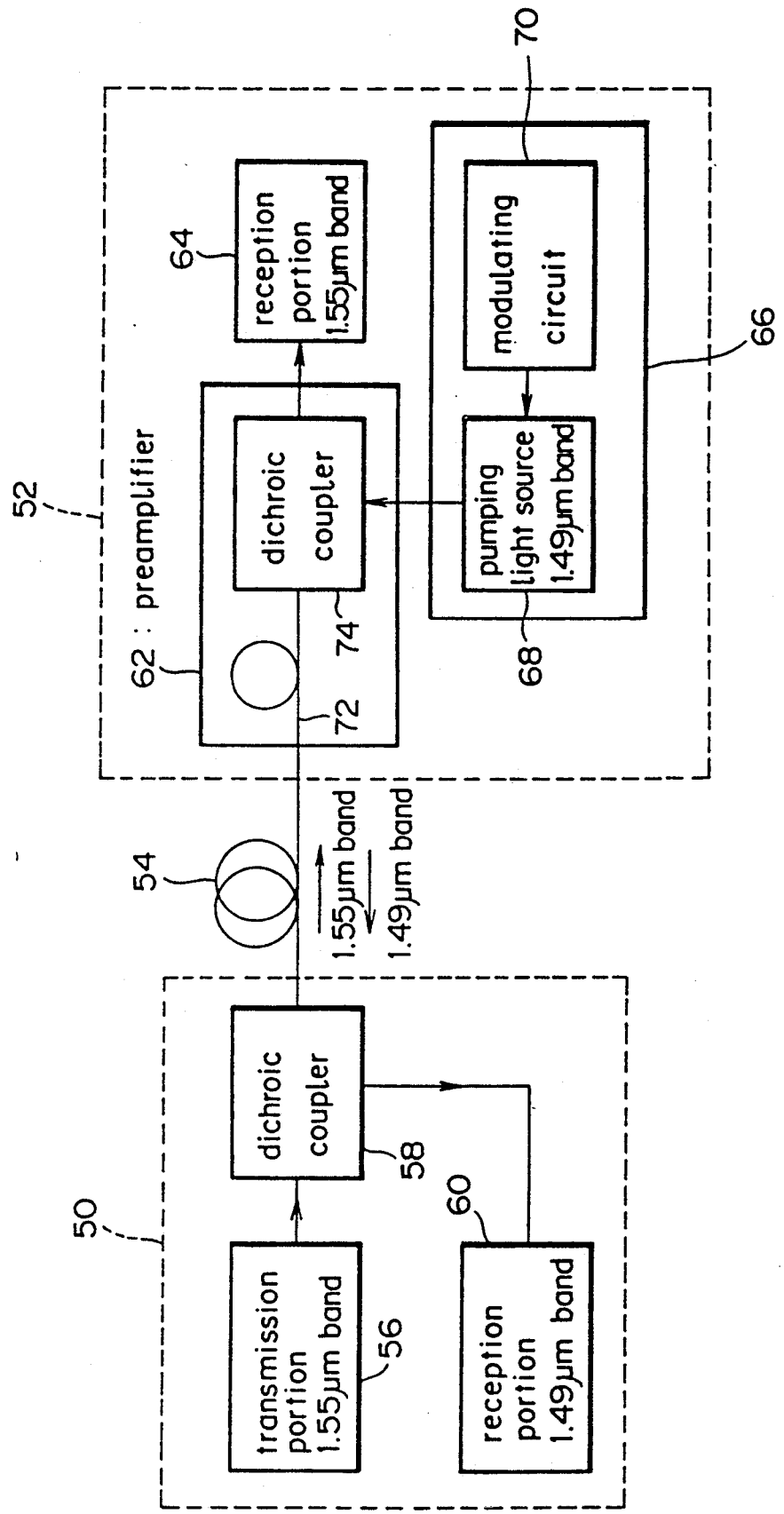
FIG. 7 is a block diagram of a two-way transmission system according to an embodiment of the present invention.

FIG. 7 is a block diagram showing an arrangement of a two-way transmission system with the present invention applied thereto. This system has a first terminal station 50 and second terminal station 52 connected through a single optical fiber 54 to achieve the two-way transmission. The first terminal station 50 comprises a transmission portion 56 for transmitting a signal light beam of 1.55 μm band, a reception portion for receiving a modulated pumping light beam of 1.49 μm band, and a dichroic coupler 58. The second terminal station 52 comprises a preamplifier 62, a reception portion 64 for receiving the signal light beam of 1.55 μm band, and a transmission portion 66 for modulating and transmitting the pumping light beam of 1.49 μm band. The transmission portion 66 includes a pumping light source 68 and a modulating circuit 70 for intensity-modulating the semiconductor laser of the pumping light source 68. The preamplifier 62 includes a rare-earth-doped fiber 72 connected with the optical fiber 54 and a dichroic coupler 74 for both leading the modulated pumping light beam into the rear-earth-doped fiber 72 and delivering the signal light beam amplified by the rare-earth-doped fiber 72 to the reception portion 64.

The signal light beam from the transmission portion 56 of the first terminal station 50 is delivered to the optical fiber 54 through the dichroic coupler 58 and, then, amplified by the preamplifier 62 of the second terminal station 52 and received by the reception portion 64. At this time, since the signal light beam is amplified by the preamplifier 62 (optical fiber amplifier), reception sensitivity is enhanced. On the other hand, the modulated pumping light beam delivered from the transmission portion 66 of the second terminal station 52 contributes to the amplification of the signal light beam from the first terminal station 50 producing no effect of its modulated state on the signal light beam and, then, it is transmitted to the first terminal station 50 through the optical fiber 54 and accepted by the reception portion 60 so that the transmitted information is reproduced therein.

Since the signal light beam and the pumping light beam are adapted to be propagated in the directions opposite to each other through the rare-earth-doped fiber 72, the two-way transmission is achieved by the transmission of information with the signal light beam and by the transmission of information with the pumping light beam acting as the carrier.

The modulation of the pumping light source 68 in the transmission portion 66 of the second terminal station 52 is performed, as in the embodiment described with reference to FIG. 5 and FIG. 6, by a high-frequency modulating signal having a period shorter than the life span of fluorescence resulting from the excited state in the rare-earth-doped fiber or thereabout.

In the case where the rare-earth-doped fiber is doped with erbium as the rare earth element, the life span of fluorescence resulting from the excited state is approximately 14 ms, for example, and, hence, a practically sufficient transmission capacity can be obtained.

What is claimed is:

1. An optical amplifier, comprising:
   a rare-earth-doped fiber;
   means for introducing a signal light beam into said rare-earth-doped fiber, the signal light beam being modulated by a first information signal;
   a pumping light source emitting a pumping light beam;
   means for modulating the pumping light beam with a second information signal having a period shorter than a life span of fluorescence resulting from an excited state in said rare-earth-doped fiber;
   means for transmitting the second information signal with the pumping light beam as a carrier, and transmitting the first information signal with the signal light beam; and
   a dichroic coupler for separating from the signal light beam another pumping light beam modulated by a third information signal prior to being input with the signal light beam, and for combining the pumping light beam and the signal light beam for amplification thereof.

2. An optical amplifier including an optical fiber amplifier amplifying a signal light beam by propagating the signal light beam and a pumping light beam through a rare-earth-doped fiber in the optical fiber amplifier, comprising:
   a pumping light source emitting a pumping light beam;
   means for modulating the pumping light beam with a high-frequency modulating signal having a period shorter than a life span of fluorescence resulting from an excited state in the rare-earth-doped fiber;
   means for transmitting information with the pumping light beam as a carrier, and transmitting information with the signal light beam;
   an optical coupler, operatively connected to said optical fiber amplifier, and splitting the output of said optical amplifier into portions in a predetermined ratio;
   filter means, operatively connected to said optical coupler, for removing a pumping light beam component from one of the split portions of the output; and
   control means, operatively connected to said filter means, for controlling an average value of power of the pumping light source to provide the output of the signal light beam at a predetermined value.

3. An optical amplifier including an optical fiber amplifier amplifying a signal light beam by propagating the signal light beam and a pumping light beam through a rare-earth-doped fiber in the optical fiber amplifier, comprising:
   a pumping light source emitting a pumping light beam;
   means for modulating the pumping light beam with a high-frequency modulating signal having a period shorter than a life span of fluorescence resulting from an excited state in the rare-earth-doped fiber;
   means for transmitting information with the pumping light beam as a carrier, and transmitting information with the signal light beam;
   a dichroic coupler for separating from the signal light beam another pumping light beam modulated by information and input with the signal light beam, and for combining the pumping light beam with the signal light beam for amplification thereof;
   a receiver, operatively connected to said optical fiber amplifier, and receiving the pumping light beam modulated by the information and separated from the signal light beam by said dichroic coupler;
   an agreement detector, operatively connected to said receiver, and detecting whether a set of address information received by said receiver agrees with a set of predetermined address information; and a controller, operatively connected to said agreement detector, and controlling a modulated signal, when the sets of information are in agreement, depending on the information received by said receiver.

4. An optical communication system having an optical repeater, comprising:
   an optical amplifier including a rare-earth-doped fiber provided in said optical repeater;
   means for modulating a signal light beam with a first information signal;
   means for introducing the signal light beam into said rare-earth-doped fiber;
   a pumping light source emitting a pumping light beam;
   means for modulating the pumping light beam with a second information signal having a period shorter than a life span of fluorescence resulting from an excited state in said rare-earth-doped fiber; and
   means for transmitting the second information signal with the pumping light beam as a carrier, and transmitting the first information signal with the signal light beam.

5. An optical communication system according to claim 4, wherein the signal light beam and the pumping light beam are propagated in opposite directions through the rare-earth-doped fiber, and said means for transmitting the second information signal performs a two-way transmission with the signal light beam and with the pumping light beam as the carrier.

6. An optical communication system having an optical repeater including an optical fiber amplifier amplifying a signal light beam by propagating the signal light beam and a pumping light beam through a rare-earth-doped fiber in the optical fiber amplifier, wherein said optical amplifier comprises:
   a pumping light source emitting a pumping light beam;
   means for modulating the pumping light beam with a high-frequency modulating signal having a period shorter than a life span of fluorescence resulting from an excited state in the rare-earth-doped fiber;
   means for transmitting first information with the pumping light beam as a carrier, and transmitting second information with the signal light beam, the signal light beam and the pumping light beam propagated in a same direction through the rare-earth-doped fiber with the first information transmitted by the pumping light beam including a supervisory signal for said optical repeater.

7. An optical communication system, comprising:
   a first terminal station including
      an optical amplifier including an optical fiber amplifier amplifying a signal light beam by propagating the signal light beam and a pumping light beam through a rare-earth-doped fiber in the optical fiber amplifier,
      first reception means for receiving the signal light beam amplified by said optical amplifier, and
      first transmission means, operatively connected to said first reception means, for transmitting a modulated pumping light beam in a direction opposite to the signal light beam; and
   a second terminal station, including
      second transmission means for outputting a signal light beam,
      a dichroic coupler, operatively connected to said second transmission means, for separating the pumping light beam of said first terminal station from the signal light beam, and
      second reception means, operatively connected to said dichroic coupler and to said second transmission means, for receiving the pumping light beam from said dichroic coupler.

8. An optical repeater in an optical transmission line, comprising:
   an optical fiber amplifier including a rare-earth-doped fiber;
   means for receiving a signal light beam, modulated by a first information signal, from the optical transmission line and inputting the signal light beam to said optical fiber amplifier;
   a pumping light source emitting a pumping light beam;
   means for modulating the pumping light beam with a second information signal;
   means for inputting the modulated pumping light beam to said optical fiber amplifier; and
   means for inputting the signal light beam and the pumping light beam propagated through said optical fiber amplifier to the optical transmission line.

* * * * *

UNITED STATES PATENT AND TRADEMARK OFFICE
CERTIFICATE OF CORRECTION

PATENT NO. : 5,299,048
DATED : March 29, 1994
INVENTOR(S) : Masuo SUYAMA

It is certified that error appears in the above-indentified patent and that said Letters Patent is hereby corrected as shown below:

Col. 1, line 14, after "is", insert --doped--;
Line 20, after "their", insert --bit-rate-free--;
Line 23, after "amplifiers", insert a comma (",");
Line 24, delete "such";
Line 33, delete "the", second occurrence;
Line 35, after "a", insert --rare--;
Line 41, after "an", insert --optical fiber--;
Line 49, after "supervisory", insert --system applicable to--;
Line 54, after "No.", insert --5--;
Line 55, after "the", first occurrence, insert --Ellis system--.

Col. 2, line 26, after "optical", insert --element which is--;
Line 29, after "a", insert --high-frequency--;
Line 32, after "with", insert --the--;
Line 50, after "simply", insert --achieved by using the--.

Col. 3, line 65, delete "That is";
Line 66, delete "as" and insert therefor --As--.

Signed and Sealed this

Sixth Day of June, 1995

Attest:

BRUCE LEHMAN

Attesting Officer

Commissioner of Patents and Trademarks